United States Patent
Nambiar et al.

(10) Patent No.: US 8,781,798 B2
(45) Date of Patent: Jul. 15, 2014

(54) SYSTEMS AND METHODS FOR EXPLORING AND UTILIZING SOLUTIONS TO CYBER-PHYSICAL ISSUES IN A SANDBOX

(75) Inventors: Ullas Balan Nambiar, Haryana (IN); Smruti Ranjan Sarangi, Gurgaon (IN); Biplav Srivastava, Noida (IN); Vivek Tyagi, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 620 days.

(21) Appl. No.: 13/088,915

(22) Filed: Apr. 18, 2011

(65) Prior Publication Data
US 2012/0265504 A1 Oct. 18, 2012

(51) Int. Cl.
*G06F 17/50* (2006.01)
*G06F 7/60* (2006.01)
*G06F 17/10* (2006.01)
*G06G 7/48* (2006.01)
*G06N 5/02* (2006.01)
*G06T 17/05* (2011.01)
*G06T 17/00* (2006.01)
*G06T 7/00* (2006.01)
*G06T 17/10* (2006.01)

(52) U.S. Cl.
CPC *G06N 5/02* (2013.01); *G06T 17/05* (2013.01); *G06T 17/00* (2013.01); *G06T 7/0081* (2013.01); *G06T 17/10* (2013.01); *G06T 2207/30184* (2013.01)
USPC ........................................ 703/2; 703/1; 703/6

(58) Field of Classification Search
USPC ................................................ 703/1–2, 6
See application file for complete search history.

(56) References Cited

U.S. PATENT DOCUMENTS

| | | | |
|---|---|---|---|
| 2008/0221843 A1* | 9/2008 | Shenkar et al. | 703/1 |
| 2010/0094611 A1 | 4/2010 | Sankaranarayanan et al. | |
| 2010/0299651 A1 | 11/2010 | Fainekos et al. | |

FOREIGN PATENT DOCUMENTS

WO 2011002583 6/2011

OTHER PUBLICATIONS

Doniec, A., Mandiau, R., Piechowiak, S., & Espié, S. (2008). A behavioral multi-agent model for road traffic simulation. Engineering Applications of Artificial Intelligence, 21(8), 1443-1454.*
Crenshaw, Tanya L., and Beyer, Steven, "UPBOT: A Testbed for Cyber-Physical Systems", 3rd Workshop on Cyber Security Experimentation and Test, Aug. 9, 2010, 8 pages, USENIX, Berkeley, CA, USA.
Huang, Huang-Ming, et al., "Cyber-Physical Systems for Real-Time Hybrid Structural Testing: A Case Study", 1st International Conference on Cyber-Physcial Systems (ICCPS), Apr. 13-15, 2010, 10 pages, ACM, New York, NY, USA.
Dabholkar, Akshay, and Gokhale, Aniruddha, "An Approach to Middleware Specialization for Cyber Physical Systems", Distributed Computing Systems Workshops, 2009, ICDCS Workshops '09 29th IEEE International Conference on Digital Object Identifier, 6 pages, IEEE, Montreal, QC, Canada.

(Continued)

*Primary Examiner* — Aniss Chad
(74) *Attorney, Agent, or Firm* — Ference & Associates LLC

(57) ABSTRACT

Methods and arrangements for accommodating and synthesizing data for seeking broad-based solutions to complex problems. Logical models with respect to infrastructure in a first location are created. System-level models are created with respect to the logical models, and simulations are performed on the system-level models to verify expected behavior. Feedback is employed from the performed simulations to forecast changes in the system-level models.

19 Claims, 12 Drawing Sheets

(56) References Cited

OTHER PUBLICATIONS

Kim, J. E., and Mosse, Daniel, "Generic Framework for Design, Modeling and Simulation of Cyber Physical Systems", SIGBED Newsletter, Jan. 2008, vol. 5, Issue 1, ASM, New York, NY, USA.

Wan, Kaiyu, et al., Specification, Analyzing Challenges and Approaches for Cyber-Physical Systems (CPS), Engineering Letters, Aug. 19, 2010, 8 pages, vol. 18, Issue 3, International Association of Engineers, Hong Kong, China.

Koubaa, Anis, and Andersson, Bjorn, "A Vision of Cyber-Physical Internet", 8th International Workshop on Real-Time Networks (RTN'09), Jul. 1-3, 2009, 6 pages, ECTRS 2009, Dublin, Ireland.

Kumar, Vipin, et al., "Algorithms for Constraint Satisfaction Problems: A Survey", AI Magazine, 1992, pp. 32-44, vol. 13, Issue 1, Association for Advancement of Artificial Intelligence, Menlo Park, California, USA.

Shang, Weixiong, et al., "Collecting and Analyzing Mobility Data from Mobile Network", Proceedings of International Conference on Broadband Network & Multimedia Technology, Oct. 18-20, 2009, 7 pages, IEEE, Beijing, China.

Srivastava, Biplav, "A New Look at the Traffic Management Problem and Where to Start", IBM Research Report, RI 10014, Nov. 29, 2010, 5 pages, IBM Research—India, New Delhi, India Biem, A., et al., "IBM InfoSphere Streams for Scalable, Real-Time, Intelligent Transportation Services", Proceedings of the 2010 International Conference on Management of Data, SIGMOD'10, Jun. 6-11, 2010, pp. 1093-1103, Indianapolis, Indiana, ACM, New York, New York.

\* cited by examiner

US 8,781,798 B2

SYSTEMS AND METHODS FOR EXPLORING AND UTILIZING SOLUTIONS TO CYBER-PHYSICAL ISSUES IN A SANDBOX

BACKGROUND

There has been tremendous evolution in the sphere of accommodating and synthesizing data from a very wide variety of sources for the purpose of seeking creative and broad-based solutions to complex local problems. For instance, addressing traffic management problems in one city can benefit from assimilating data and solutions from other cities not only from the same country but from throughout the world. Such broad-based smart or intelligent problem-solving is at the heart of efforts such as, e.g., "Solutions for a Smarter Planet" (or "Smarter Planet") by International Business Machines (IBM) of Armonk, N.Y.

However, in pursuing broad-based solutions as discussed above, problems have often been encountered in retrieving data from diverse and disparate instrumentation and/or other input sources, leading to costly, slow, noisy, insufficient and error-prone data retrieval and synthesis. Physical and communicative constraints and limitations thus often provide roadblocks to offering the smart solutions and intelligent results that otherwise could make a critical difference in addressing local challenges in complex arenas such as traffic and infrastructure.

BRIEF SUMMARY

In summary, one aspect of the invention provides a method comprising: creating logical models with respect to infrastructure in a first location; creating system-level models with respect to the logical models; performing simulations on the system-level models to verify expected behavior; and employing feedback from the performed simulations to forecast changes in the system-level models.

Another aspect of the invention provides an apparatus comprising: at least one processor; and a computer readable storage medium having computer readable program code embodied therewith and executable by the at least one processor, the computer readable program code comprising: computer readable program code configured to create logical models with respect to infrastructure in a first location; computer readable program code configured to create system-level models with respect to the logical models; computer readable program code configured to performing simulations on the system-level models to verify expected behavior; and computer readable program code configured to employ feedback from the performed simulations to forecast changes in the system-level models.

An additional aspect of the invention provides a computer program product comprising: a computer readable storage medium having computer readable program code embodied therewith, the computer readable program code comprising: computer readable program code configured to create logical models with respect to infrastructure in a first location; computer readable program code configured to create system-level models with respect to the logical models; computer readable program code configured to performing simulations on the system-level models to verify expected behavior; and computer readable program code configured to employ feedback from the performed simulations to forecast changes in the system-level models.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
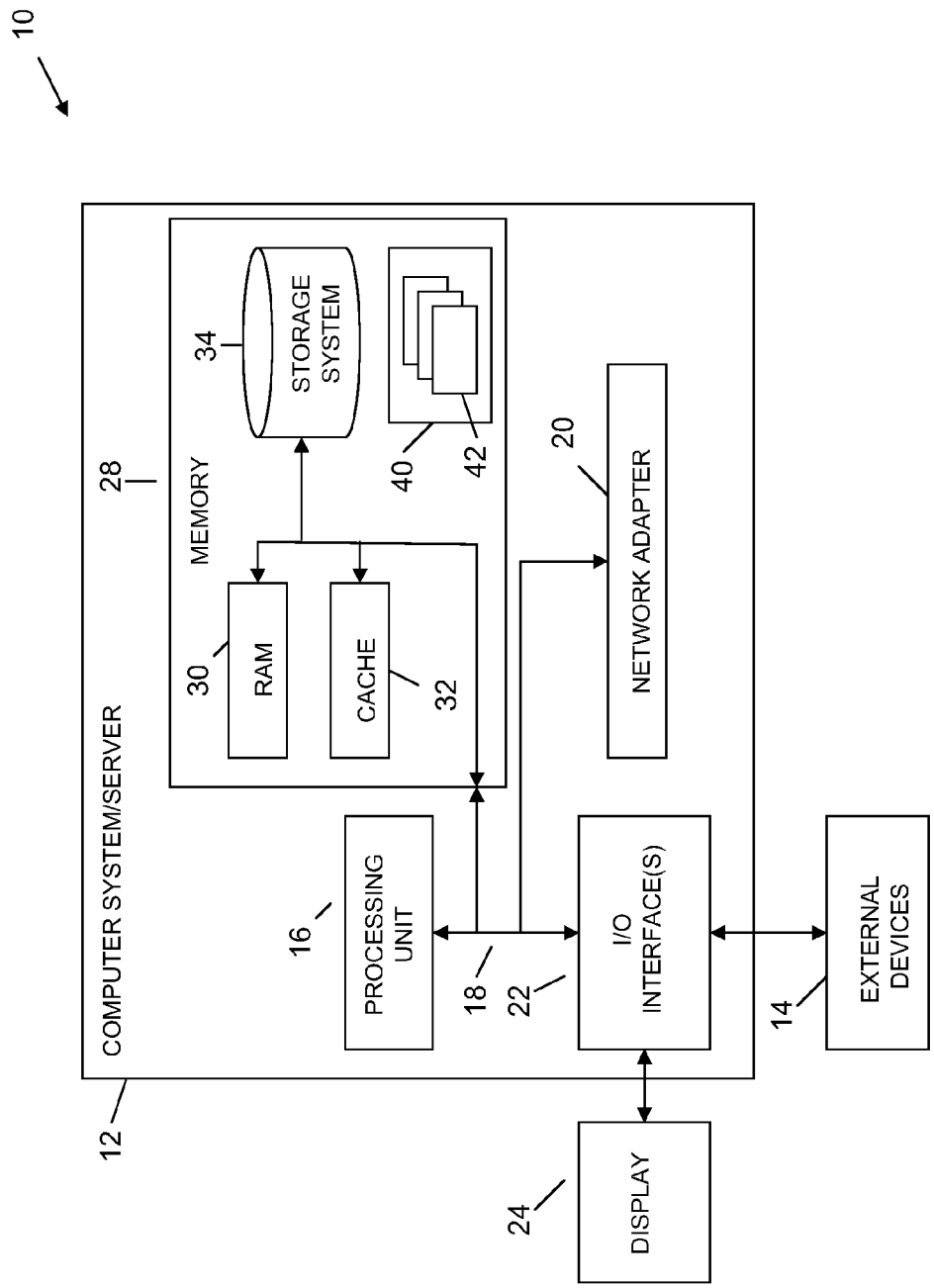
FIG. 1 depicts a cloud computing node according to an embodiment of the present invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, at least one processor or processing units 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, at least one application program, other program modules, and program data. Each of the operating system, at least one application program, other program modules, and program data or some combination thereof, may include an implementation of a networking environment. Program modules 42 generally carry out the functions and/or methodologies of embodiments of the invention as described herein.

Computer system/server 12 may also communicate with at least one external device 14 such as a keyboard, a pointing device, a display 24, etc.; at least one device that enables a user to interact with computer system/server 12; and/or any devices (e.g., network card, modem, etc.) that enable computer system/server 12 to communicate with at least one other computing device. Such communication can occur via Input/Output (I/O) interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
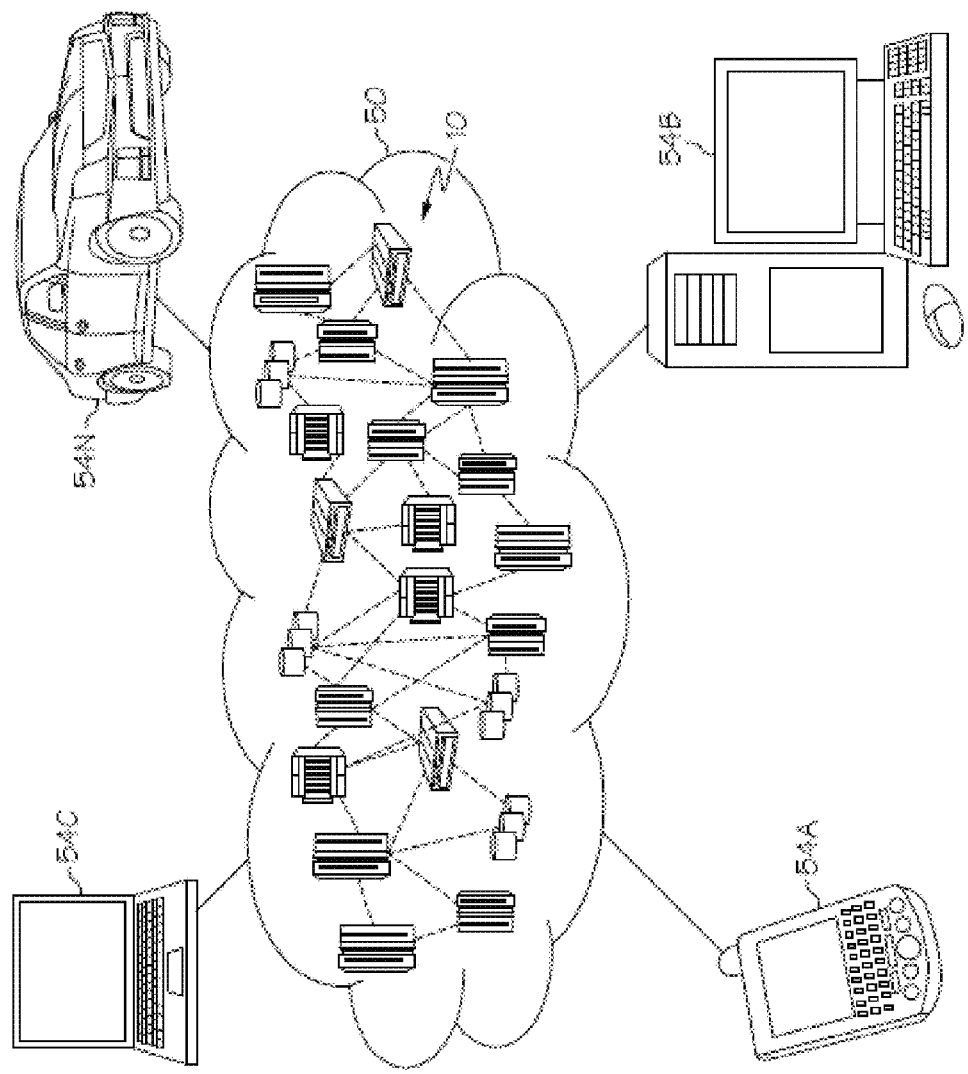
FIG. 2 depicts a cloud computing environment according to an embodiment of the present invention.

Referring now to FIG. 2, illustrative cloud computing environment 50 is depicted. As shown, cloud computing environment 50 comprises at least one cloud computing node 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in at least one network, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
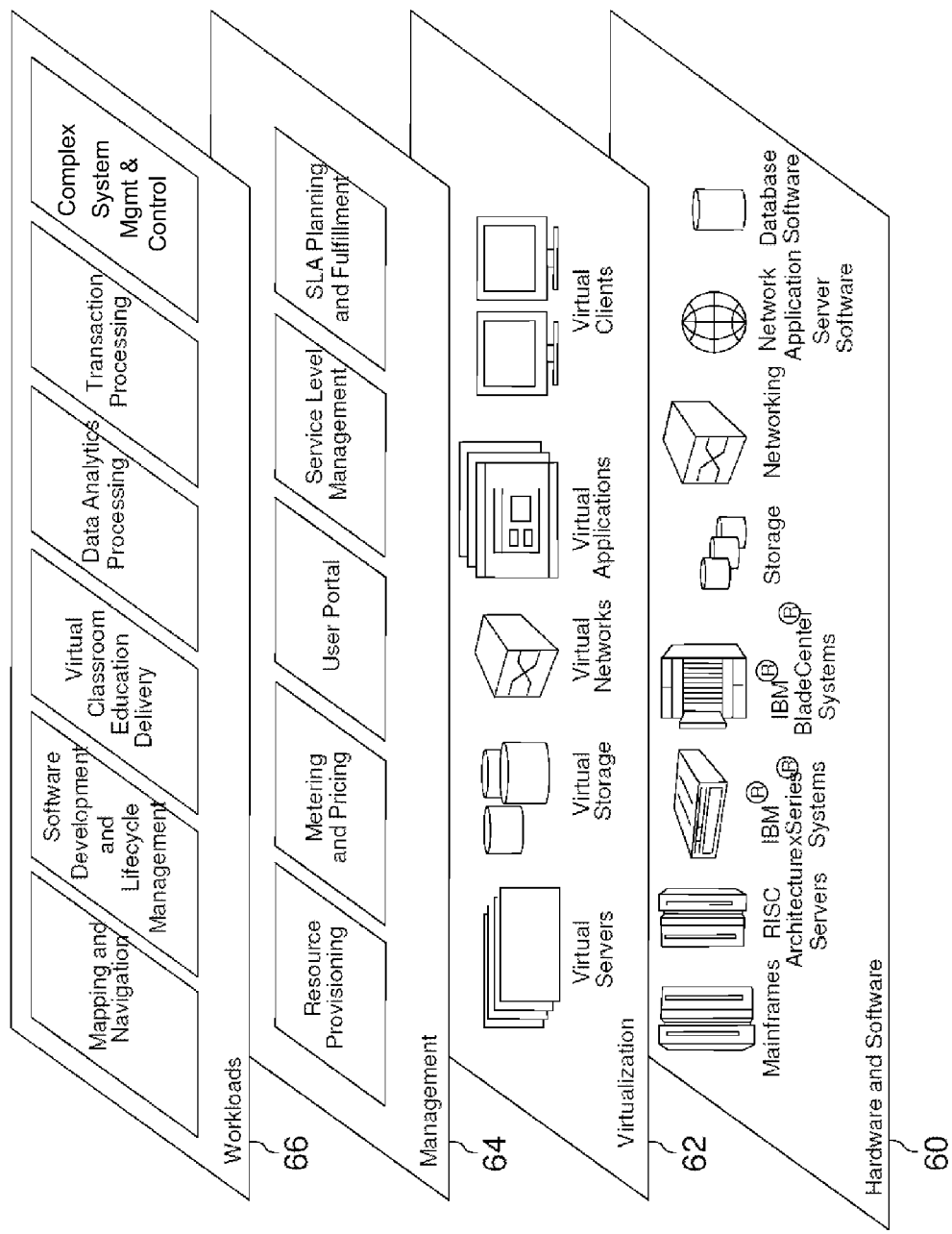
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and complex management system and control. This latter function, complex management system and control, will be better understood herebelow from the discussion with respect to FIGS. 4-11; a controller for undertaking such functions, in accordance with at least one embodiment of the invention, is indicated in FIGS. 4-11 at 406 and via reference numerals advanced therefrom by a multiple of 100.

The disclosure now turns to FIGS. 4-11. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIGS. 4-11 can be performed or utilized by way of a processing unit or units and system memory such as those indicated, respectively, at 16 and 28 in FIG. 1, whether on a server computer, a client computer, a node computer in a distributed network, or any combination thereof.

Figure 4:
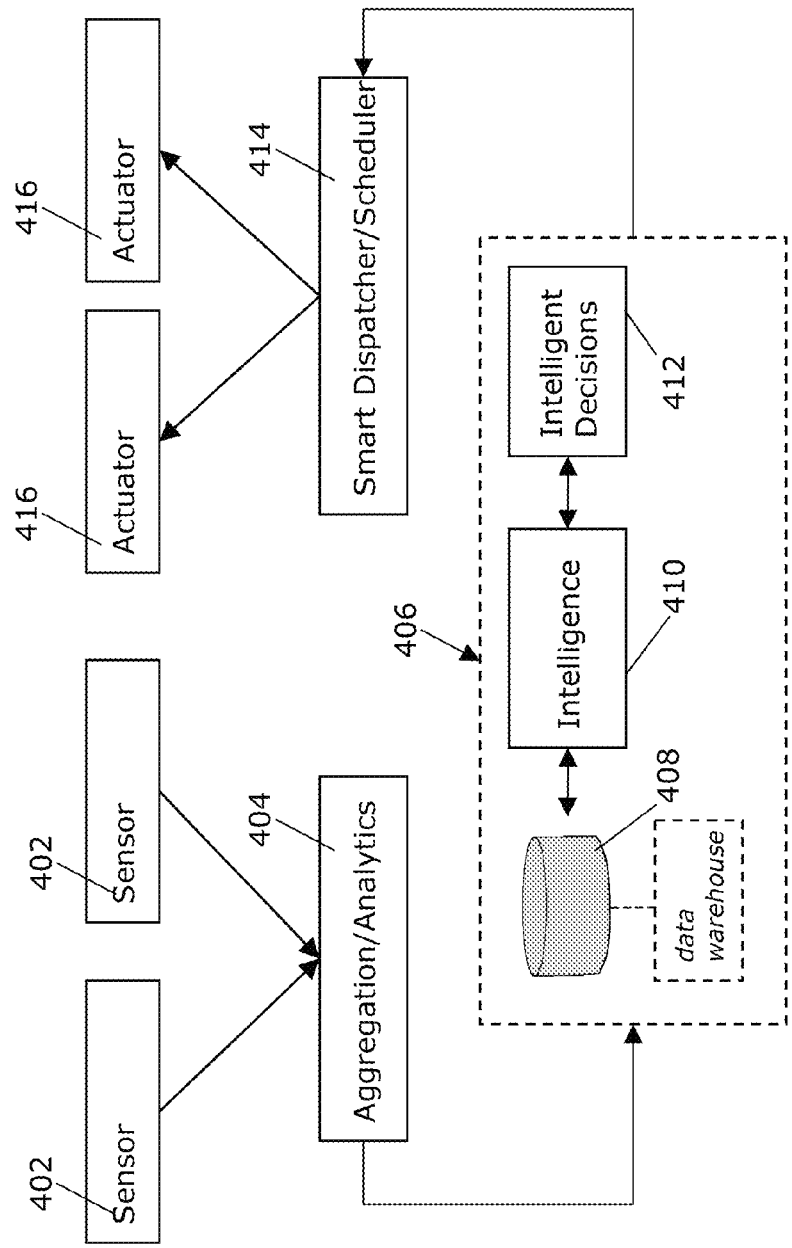
FIG. 4 schematically illustrates a broad-based system which may accommodate at least one embodiment of the invention.
Figure 9:
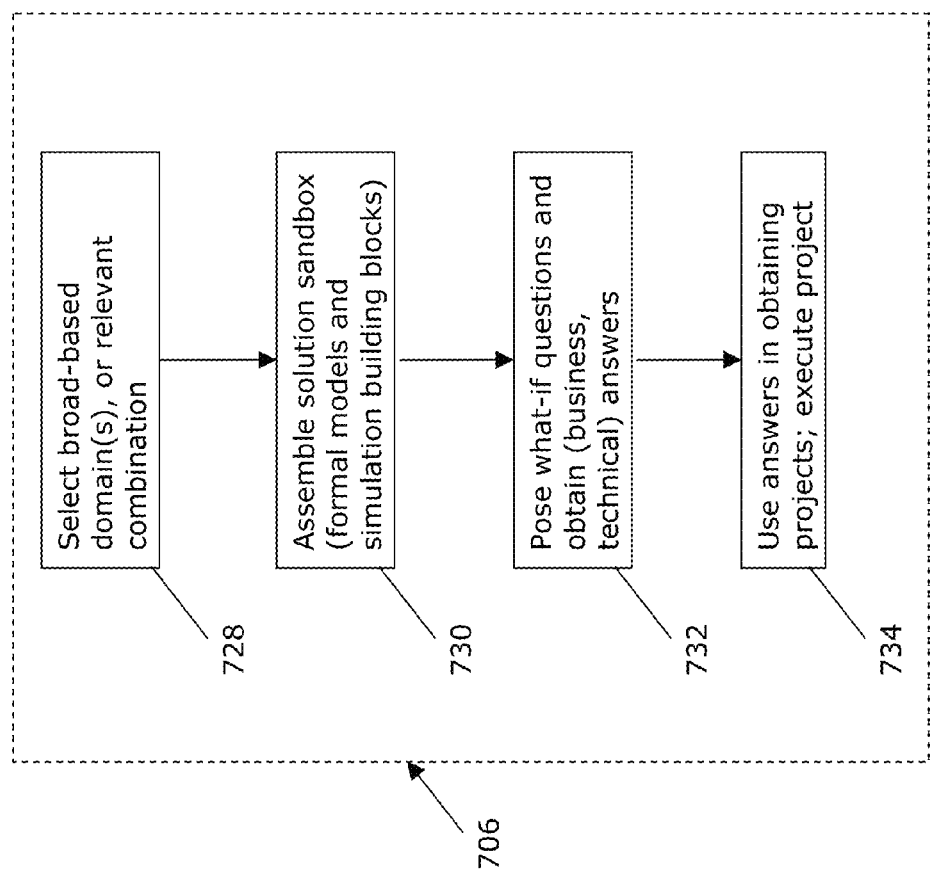
FIG. 9 broadly illustrates actions that may be undertaken by a controller, in accordance with at least one embodiment of the invention.
Figure 10:
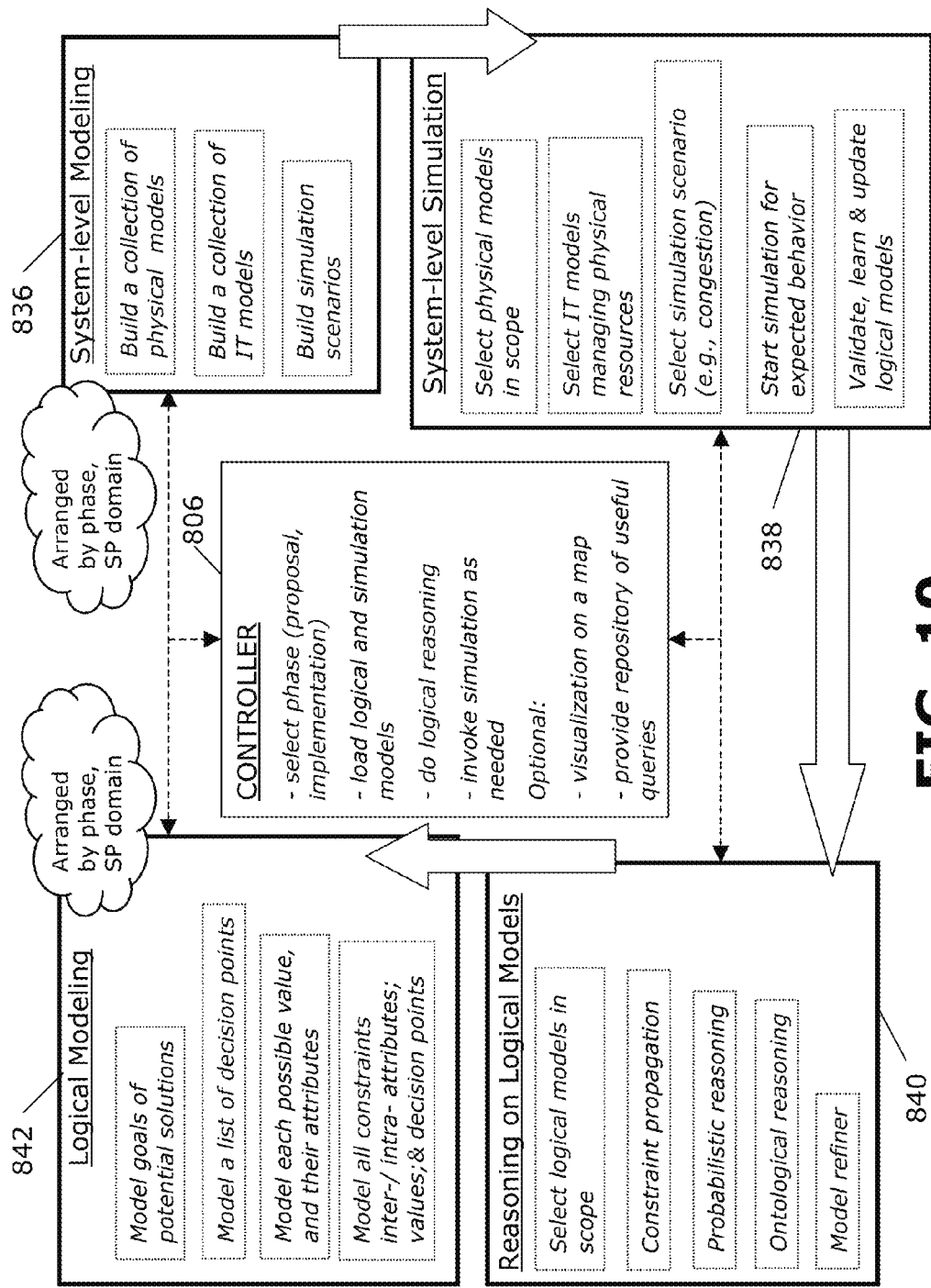
FIG. 10 more particularly illustrates detailed actions that may be undertaken and managed by a controller, in accordance with at least one embodiment of the invention.
Figure 11:
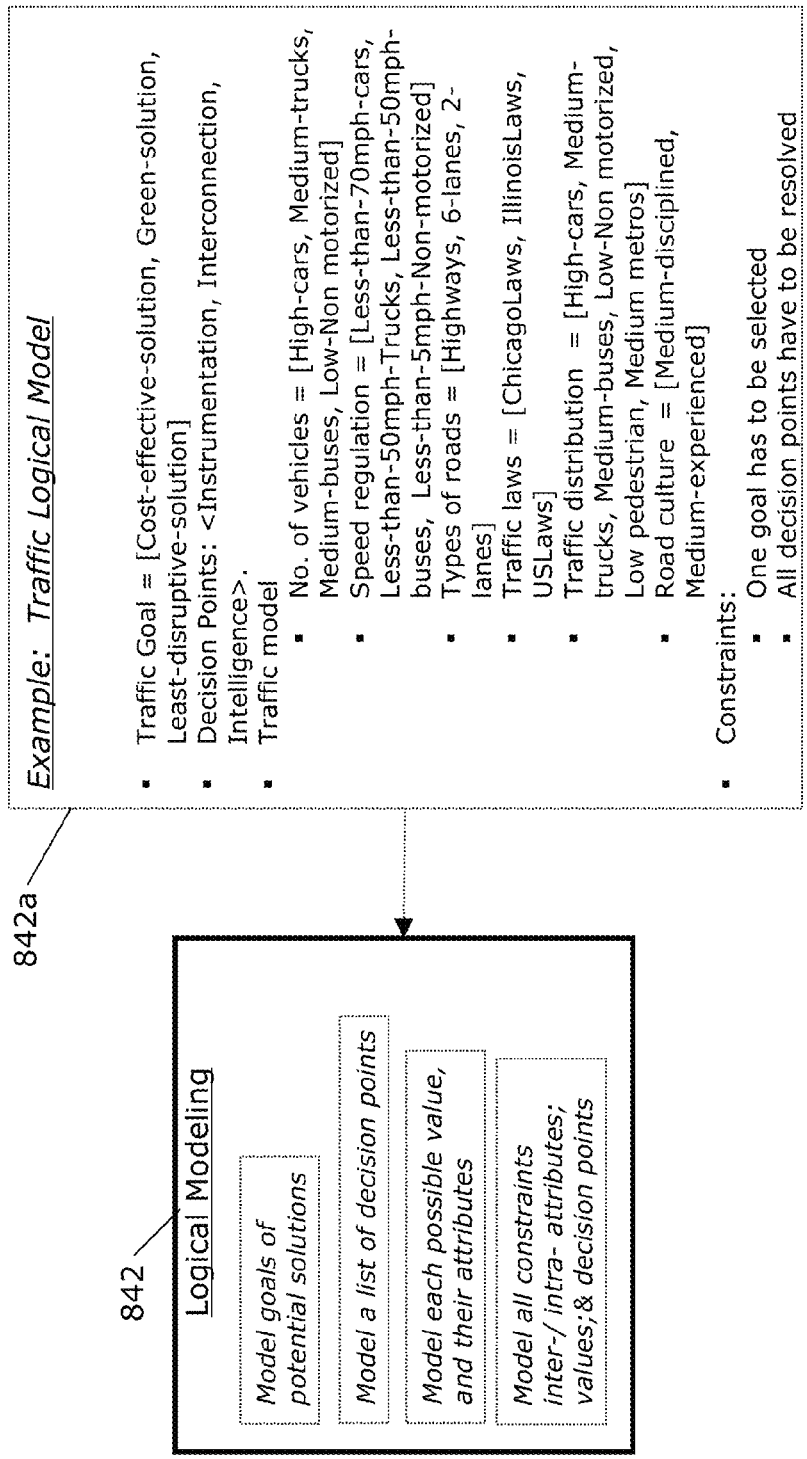
FIG. 11 provides more details of logical modeling.

To facilitate easier reference, in advancing from FIG. 4 to and through FIG. 11, a reference numeral is advanced by a multiple of 100 in indicating a substantially similar or analogous component or element with respect to at least one component or element found in at least one earlier figure among FIGS. 4-11.

FIG. 4 schematically illustrates a broad-based system which may accommodate at least one embodiment of the invention. The system shown in FIG. 4, by way of an illustrative and non-restrictive example, may be analogous to the IBM "Smarter Planet" system referred to herethroughout.

Figure 8:
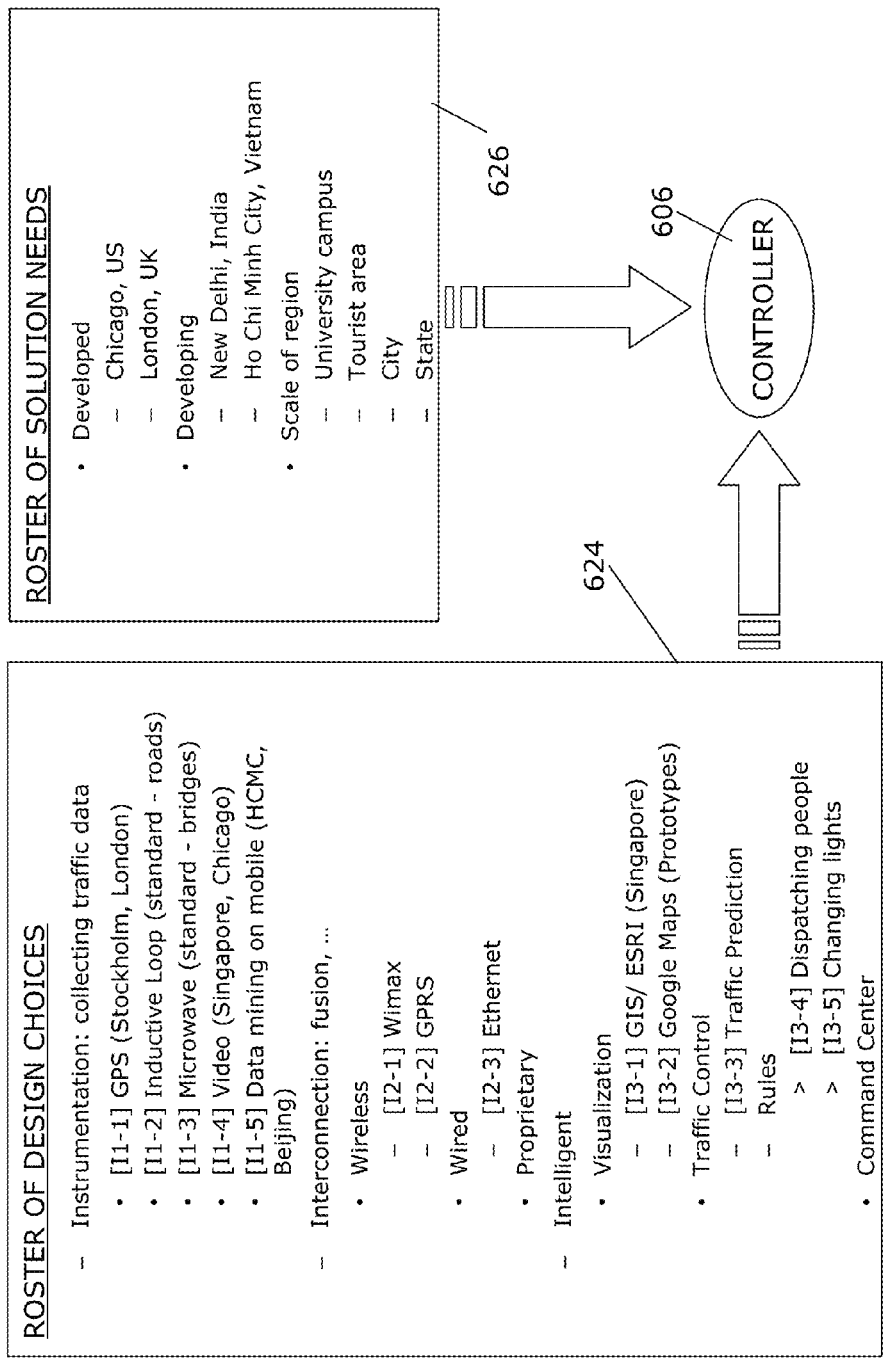
FIG. 8 details types of inputs that can be accommodated by a controller, in accordance with at least one example embodiment of the invention.

As shown in FIG. 4, physical sensors 402 (which may be numerous, though only two are shown here) can be disposed and configured to collect data, e.g., complex system data such as urban infrastructure or traffic data. Some examples of arrangements for collecting data for traffic can be provided in the format of an identifier, followed by a description and an indication of regions where they have been prominent (and as also shown in FIG. 8 in the roster of design choices 624, in accordance with an example embodiment): [I1-1], GPS enabled vehicles travelling on the road (notably used in Stockholm and London); [I1-2], inductive loop detectors laid under the roads to count vehicles (known around the world in developed countries); [I1-3], microwave devices on bridges to count vehicles (known around the world in developed countries); [I1-4], video cameras to record traffic movement, followed by processing via using software (notably used in Singapore and Chicago); and [I1-5], data mining on mobility data collected by telecommunication service providers (notably used in Beijing and Ho Chi Minh City [HCMC], Vietnam). It can be noted that, often, more than one data collection technology is used in a given city. Similarly, multiple data collection technologies can exist in water, public safety and other cyber-physical domains. The individual technologies presented here are done so merely by way of illustrative and non-restrictive example, and a very wide variety of other data collection technologies are available that can be incorporated into embodiments of the invention.

In a broad-based system such as that shown in FIG. 4, collected data is then sent to an aggregation/analytics module 404 and thence to a controller 406. Module 404 can employ any of a very wide variety of methods for aggregating and analyzing data, depending on the type of data being assimilated. For example, a description of the collection and analysis of mobile phone data can be found in, "Collecting and Analyzing Mobility Data from Mobile Network", by Weixiong Shang, Yanfeng Zhu, Jin Zhou and Chun Ying, Proceedings of IC-BNMT2009. Essentially any suitable method of data aggregation and analysis may be employed in conjunction with module 404, in a manner to best suit the type and nature of the data at hand.

Controller 406 includes, and/or has access to and/or interfaces with, a data warehouse 408, an intelligence module 410 and a decision module 412. As such, data are assimilated from the warehouse 408 and combined with intelligence (e.g., business intelligence or historical data) at 410 and combined to render decisions at 412 (e.g., via business rules technology as widely known). The rendered decisions are then transmitted to a smart dispatcher/scheduler 414, with execution finally taking place by way of actuators 416 (which may be numerous, though only two are shown here). While the broad-based system shown in FIG. 4 can be analogous to an IBM "Smarter Planet" system, it should be understood that essentially any of a very wide variety of broad-based systems may be employed in accordance with embodiments of the invention. For background purposes, a description of the general functioning of an IBM "Smarter Planet" system may be found in, "IBM InfoSphere Streams for Scalable, Real-Time, Intelligent Transportation Services", by Alain Biem et al, SIGMOD 2010, where an end-to-end example relying on GPS data sources is laid out.

Broadly contemplated herein, in accordance with at least one embodiment of the invention, are methods and arrangements for availing to a user a virtual sandbox containing a wide variety of components and solutions for simulating and/or implementing a broad-based solution to a complex problem, such as one presented in a context of urban infrastructure or traffic management. The sandbox permits an efficient and cost-effective viewing of possible choices, as well as a capability for rendering better-informed decisions on resource allocation and other matters. Further, it permits a provision of guarantees, or a probability-based assessment, of the prospective effectiveness or utility of a given implementation. Generally, a sandbox in accordance with at least one embodiment of the invention is capable of providing solutions developed in one context to any of a wide variety of other contexts.

Broadly contemplated herein, in accordance with at least one embodiment of the invention, is an approach employing a "cyber-physical" solution, or one where physical inputs (e.g., measurements in the field) are combined with computer-based inputs (e.g., simulations or components thereof) to optimally provide a user with tools (e.g., in the form of a virtual sandbox as described herethroughout) to carry out a more thoroughly vetted implementation in complex problem-solving (e.g., in the context of urban infrastructure or traffic management).

In accordance with at least one embodiment of the invention, a process of retrieving and synthesizing complex-system data involves selecting at least one domain from a broad-based system (e.g., "Smarter Planet"). A solution sandbox is then assembled, which includes formal models and simulation building blocks. Queries (e.g., "what-if" queries) are then posed and answers (e.g., in the business or technical realm) are obtained. The answers then can guide in obtaining projects and in project execution.

Figure 5:
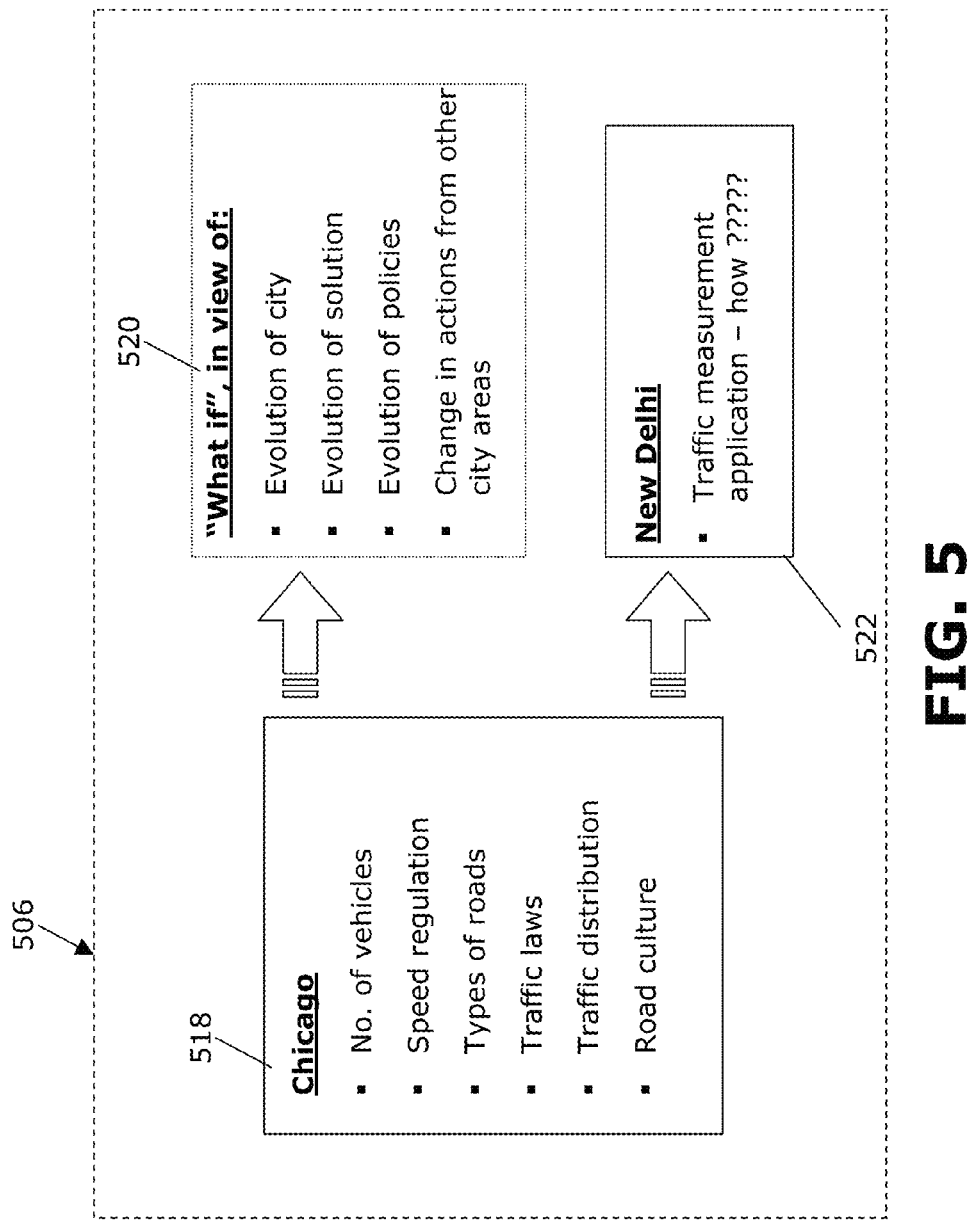
FIG. 5 broadly illustrates a problem setting that may be accommodated in accordance with at least one example embodiment of the invention.

FIG. 5 broadly illustrates a problem setting that may be accommodated in accordance with at least one example embodiment of the invention. Such a problem setting may be addressed by a controller 506, which itself may be analogous to that indicated at 406 in FIG. 4. As shown, an initial case 518 with attributes (for which data can be stored, e.g., in a warehouse such as that indicated at 408 in FIG. 4), might include traffic management data from Chicago, e.g.: the number of vehicles in the city or portion thereof, speed regulations, types of roads, traffic laws, traffic distribution and road culture. For background purposes, some details on how to characterize traffic data can be found in, "A New Look at the Traffic Management Problem and Where to Start", by Biplav Srivastava, in IBM Research Report RI10014, 2010. It can be appreciated that some data attributes are quantitative (e.g., average vehicle speed) while others are qualitative (e.g., road culture, which may be defined at least in part as general qualitative attributes or attitudes in the relationship between drivers and road; for instance, novice vs. experienced drivers, a tendency to drive in lanes vs. drive chaotically, etc.)

Figure 6:
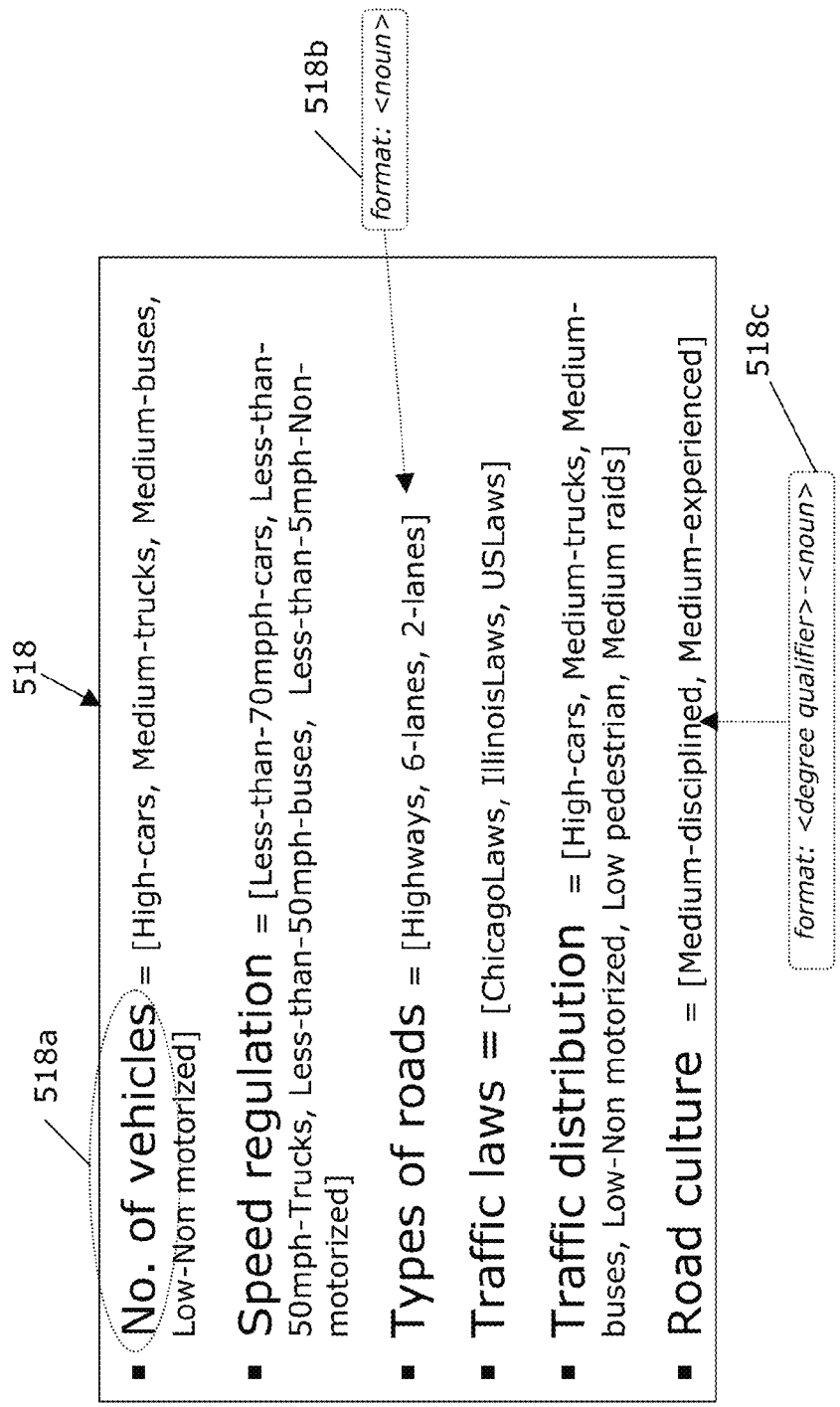
FIG. 6 provides further details of an attribute list.

In accordance with the present example embodiment, one can use the traffic information of Chicago (518) for "what-if" situations as they apply to Chicago (520), and/or for scenarios in cities other than Chicago, e.g., New Delhi (522). An attribute-value formalism can thereby be applied to record traffic attributes and possible values they are designed for or being considered for. FIG. 6 provides a more detailed view of information that can be included in an attribute list 518. As shown, for each individual attribute 518a, qualitative and non-numeric values are appended. The values have the format of terms which can be <nouns> (518b) as well as <degree-qualifier>-<noun> (518c). In alternative types of formulations, other types of values can be used such as numeric values.

Figure 7:
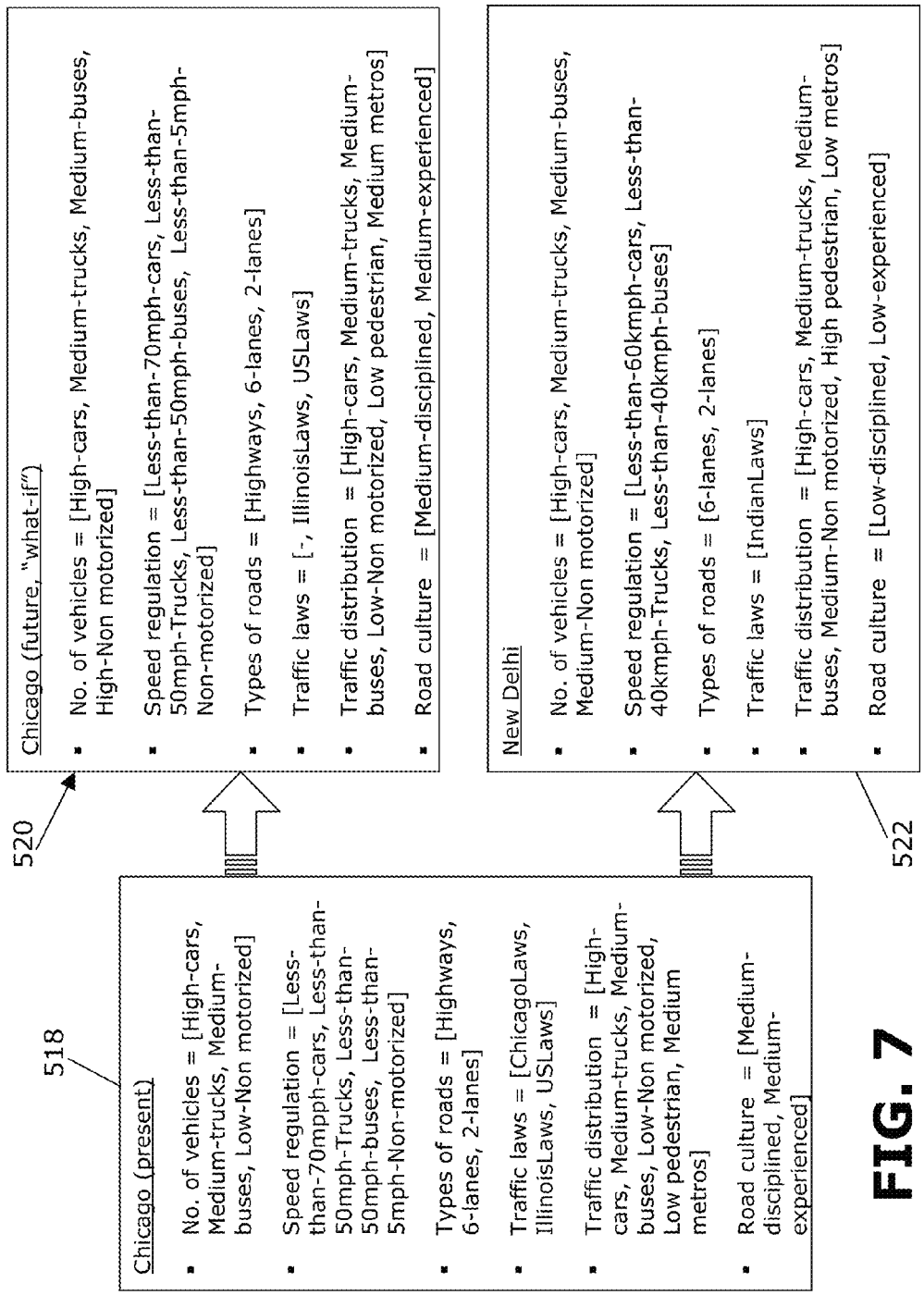
FIG. 7 provides further details of a problem setting.

In accordance with the example embodiment of the invention shown in FIG. 7, which provides further details with respect to FIG. 4, the situation for Chicago is modeled at one time instant (518). If it is then to be assumed that the "present" Chicago situation is evaluated with respect to New Delhi (522), then there the high level of non-motorized traffic is considered in addition to all Chicago-specific laws being annulled. The system will now be able to simulate the impact of these changes.

In accordance with at least one embodiment of the invention, then, the initial Chicago model (518) can be the starting point for traffic in a new city, here shown as New Delhi (522). Among the changes for New Delhi are: the non-motorized vehicles are medium in number, the speeds are different, the laws are different and the road culture is different. These changes can be automatically calculated by comparing the attributes of Chicago and New Delhi models, and doing a standard set-difference operation. A decision module such as that indicated at 412 in FIG. 4 can be employed in such an instance. As such, intermediate steps between an existing application (518) and new prospective applications (520, 522) can be carried out by changing the values of attributes as just discussed.

To further illustrate the challenges that may be encountered in a problem setting such as that laid out in FIG. 5, assume that the "target" city, New Delhi, already includes a security infrastructure (e.g., video cameras and a security command center) and intends to add traffic management capabilities. Questions might include how such infrastructure could contribute to a traffic management infrastructure. Going in the other direction, another theoretical case might be a city which starts with traffic management (e.g., GPS and a traffic command center) and intends to add security capabilities. Such cities might include Singapore, Stockholm and London. A city could also start with both security and traffic management capabilities, with the intent then to improve upon both. Accordingly, problems approached in accordance with at least one embodiment of the invention can explore solutions in terms of how things change for instrumentation, interconnection and intelligence, while tuning solutions based on other factors such as a city's budget.

FIG. 8 details types of inputs that can be accommodated by a controller 606, in accordance with at least one example embodiment of the invention. An illustrative and non-restrictive example involving traffic measurement and management is shown. The inputs may include a roster of design choices (624) and of solution needs (626), to the extent that a new solution is being sought in one setting (e.g., New Delhi) with different parameters and/or requirements than may have been encountered in an existing application setting (e.g., Chicago). In accordance with an illustrative and non-restrictive example involving traffic management, design choices 624 may include different types of information obtained from a variety of cities.

In accordance with at least one embodiment of the invention, an attribute-value formalism is used in order to record design choices 624. Many different ways of selecting attributes are possible. In one embodiment, there are three attributes, namely, instrumentation, interconnection and intelligence as shown in FIG. 8. The values for an attribute are all the possible "children" below it in FIG. 8, regardless of depth within the roster. Accordingly, in the present non-restrictive example, instrumentation (I1) can be one attribute. Its value is a set=V1. There are five unique methods for I1, called, range R1=[I1-1, I1-2, I1-3, I1-4, I1-5]. So, V1, the value of attribute I1, is any subset of R1. Other attributes and values can be formulated similarly.

In another embodiment of the invention, the attributes are defined at non-leaf levels of FIG. 8, while leaves define the range and values of the attributes. These variations do not affect the reach of a solution. The controller compares the attributes from the known design choices (624) and the requirements of a city again expressed in the attribute-value formalism (626). One way to do carry out such comparison, merely by way of illustrative example, is via a standard set-difference operation.

Further, in accordance with an illustrative and non-restrictive example involving traffic management, solution needs 626 may include different types of solutions, or solution parameters, as might be applied to different cities/regions or types of cities/regions (e.g., developed or developing, along with an indication of the scale of the region involved).

FIG. 9 broadly illustrates actions that may be undertaken by a controller 706, in accordance with at least one embodiment of the invention. As shown, a set of at least one broad-based (e.g., "Smarter Planet") domain is selected (728); a solution sandbox is assembled which includes formal models and simulation building blocks (730); "what-if" questions are posed (732); and answers (e.g., business, technical) are obtained, whereupon such answers are employed in execution solutions (734).

FIG. 10 more particularly illustrates detailed actions that may be undertaken and managed by a controller 806, in accordance with at least one embodiment of the invention. As shown, the controller 806 manages tasks broadly grouped as system-level modeling 836, system-level simulation 838, reasoning on logical models 840 and logical modeling 842.

An example of a logical modeling arrangement 842, in accordance with at least one embodiment of the invention, is shown in FIG. 11. Here, a simplistic set of goals, decision points and constraints are shown along with a model of traffic (842a). Similarly, models for other broad-based domains such as water, electricity and public safety can be created. Since the logical model 842 is made up of only constraints, reasoning can be done on it using standard constraint propagation techniques. For background purposes, and by way of an illustrative and non-restrictive example, a tutorial on constraint satisfaction programming (CSP) can be found in "Algorithms for Constraint Satisfaction Problems: A Survey", by Vipin Kumar, *AI Magazine,* 13(1):32-44, 1992.

For system level modeling in accordance with at least one embodiment of the invention, a number of off-the-shelf systems are available. One example is the Multi-Agent Transport Simulation or "MATSim", available at http://matsim.org. "MATSim" has models for road, intersections and vehicles. A city's road topology is created in the tool and then a vehicle plan is built which can then be further analyzed.

Figure 12:
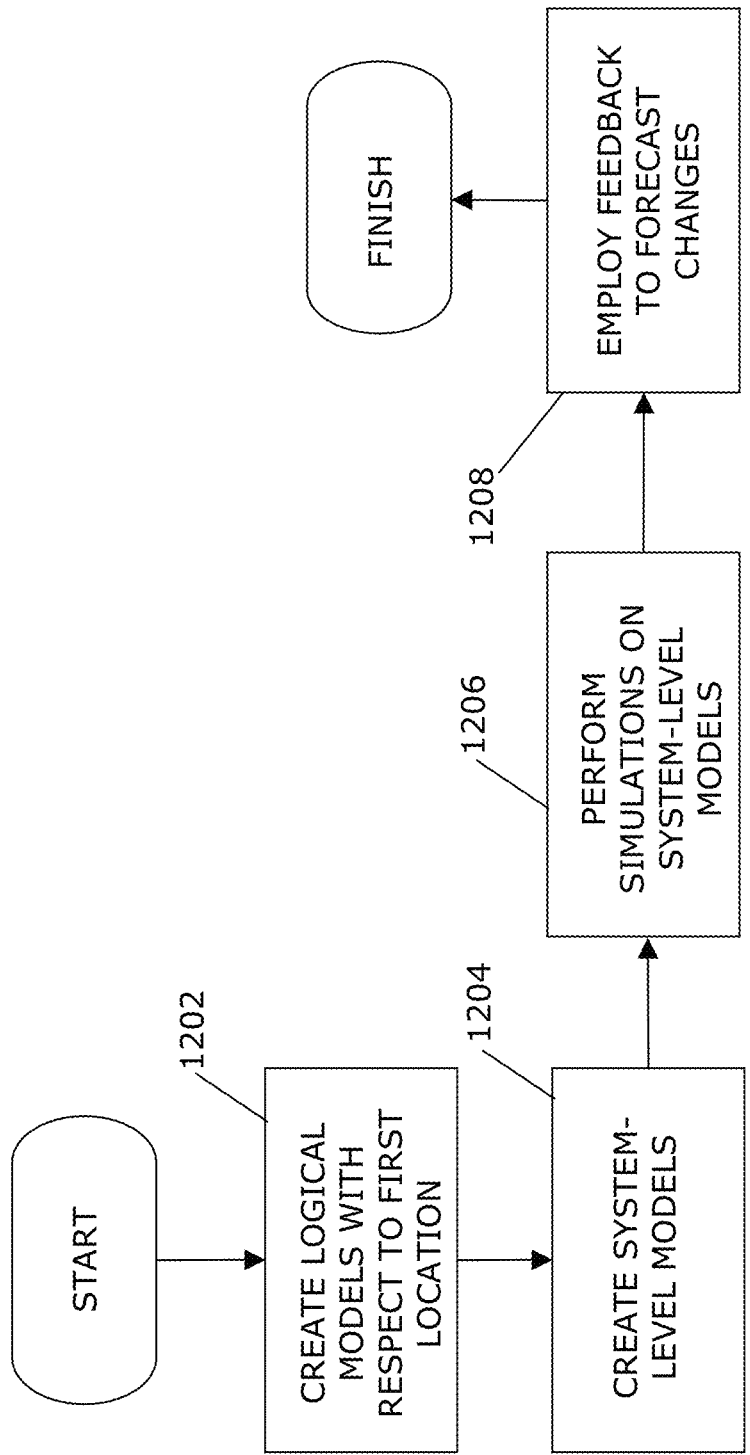
FIG. 12 sets forth a process more generally for accommodating and synthesizing data for seeking broad-based solutions to complex problems.

FIG. 12 sets forth a process more generally for accommodating and synthesizing data for seeking broad-based solutions to complex problems. It should be appreciated that a process such as that broadly illustrated in FIG. 12 can be carried out on essentially any suitable computer system or set of computer systems, which may, by way of an illustrative and non-restrictive example, include a system such as that indicated at 12 in FIG. 1. In accordance with an example embodiment, most if not all of the process steps discussed with respect to FIG. 12 can be performed by way a processing unit or units and system memory such as those indicated, respectively, at 16 and 28 in FIG. 1.

As shown in FIG. 12, logical models with respect to infrastructure in a first location are created (1202). System-level models are created with respect to the logical models (1204), and simulations are performed on the system-level models to verify expected behavior (1206). Feedback is employed from the performed simulations to forecast changes in the system-level models (1208).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   creating logical models with respect to urban infrastructure in a first location;
   creating system-level models with respect to the logical models;
   performing simulations on the system-level models to verify expected behavior;
   employing feedback from the performed simulations to forecast changes in the system-level models;
   wherein said creating of logical models comprises assimilating data from physical sensors;
   wherein said creating of system-level models comprises creating a model with respect to at least one of:
      urban infrastructure at the first location at a future timepoint; and
      urban infrastructure at a second location distinct from the first location; and
   providing the logical models and system-level models in a sandbox for subsequent use in creating at least one new logical model and at least one new system-level model for the at least one of:
      urban infrastructure at the first location at a future timepoint; and
      urban infrastructure at the second location.

2. The method according to claim 1, wherein:
   said creating of logical models comprises assimilating attributes and characteristics assigned to the attributes; and
   said creating of system-level models comprises modifying the characteristics of the attributes.

3. The method according to claim 2, wherein the characteristics comprise qualitative and non-numeric values.

4. The method according to claim 3, wherein the characteristics comprise at least one taken from the group consisting of: nouns; degree qualifiers.

5. The method according to claim 1, wherein said creating of system-level models comprises creating a model with respect to infrastructure at the first location at a future timepoint.

6. The method according to claim 5, wherein:
   said creating of logical models comprises assimilating attributes and characteristics assigned to the attributes; and
   said creating of system-level models comprises modifying the characteristics of the attributes.

7. The method according to claim 1, wherein said creating of system-level models comprises creating a model with respect to infrastructure at a second location distinct from the first location.

8. The method according to claim 7, wherein:
   said creating of logical models comprises assimilating attributes and characteristics assigned to the attributes; and
   said creating of system-level models comprises modifying the characteristics of the attributes.

9. The method according to claim 7, wherein the first and second locations comprise different cities.

10. An apparatus comprising:
    at least one processor; and
    a computer readable storage medium having computer readable program code embodied therewith and executable by the at least one processor, the computer readable program code comprising:
    computer readable program code configured to create logical models with respect to urban infrastructure in a first location;
    computer readable program code configured to create system-level models with respect to the logical models;
    computer readable program code configured to perform simulations on the system-level models to verify expected behavior;
    computer readable program code configured to employ feedback from the performed simulations to forecast changes in the system-level models;
    wherein to create models comprises assimilating data from physical sensors;
    wherein to create system-level models comprises creating a model with respect to at least one of:
       urban infrastructure at the first location at a future timepoint; and
       urban infrastructure at a second location distinct from the first location; and
    computer readable program code configured to provide the logical models and system-level models in a sandbox for subsequent use in creating at least one new logical model and at least one new system-level model for the at least one of:
       urban infrastructure at the first location at a future timepoint; and
       urban infrastructure at the second location.

11. A computer program product comprising:
    a non-transitory computer readable storage medium having computer readable program code embodied therewith, the computer readable program code comprising:
    computer readable program code configured to create logical models with respect to urban infrastructure in a first location;
    computer readable program code configured to create system-level models with respect to the logical models;

computer readable program code configured to perform simulations on the system-level models to verify expected behavior;
computer readable program code configured to employ feedback from the performed simulations to forecast changes in the system-level models;
wherein to create models comprises assimilating data from physical sensors;
wherein to create system-level models comprises creating a model with respect to at least one of:
urban infrastructure at the first location at a future timepoint; and
urban infrastructure at a second location distinct from the first location; and
computer readable program code configured to provide the logical models and system-level models in a sandbox for subsequent use in creating at least one new logical model and at least one new system-level model for the at least one of:
urban infrastructure at the first location at a future timepoint; and
urban infrastructure at the second location.

12. The computer program product according to claim 11, wherein:
said computer readable program code is configured to assimilate attributes and characteristics assigned to the attributes; and
said computer readable program code is configured to modify the characteristics of the attributes.

13. The computer program product according to claim 12, wherein the characteristics comprise qualitative and non-numeric values.

14. The computer program product according to claim 13, wherein the characteristics comprise at least one taken from the group consisting of: nouns; degree qualifiers.

15. The computer program product according to claim 11, wherein said computer readable program code is configured to create a model with respect to infrastructure at the first location at a future timepoint.

16. The computer program product according to claim 15, wherein:
said computer readable program code is configured to assimilate attributes and characteristics assigned to the attributes; and
said computer readable program code is configured to modify the characteristics of the attributes.

17. The computer program product according to claim 11, wherein said computer readable program code is configured to create a model with respect to infrastructure at a second location distinct from the first location.

18. The computer program product according to claim 17, wherein:
said computer readable program code is configured to assimilate attributes and characteristics assigned to the attributes; and
said computer readable program code is configured to modify the characteristics of the attributes.

19. The computer program product according to claim 17, wherein the first and second locations comprise different cities.

* * * * *